(12) United States Patent
Gutierrez

(10) Patent No.: US 6,525,824 B1
(45) Date of Patent: Feb. 25, 2003

(54) DUAL BEAM OPTICAL INTERFEROMETER

(75) Inventor: Roman C. Gutierrez, La Crescenta, CA (US)

(73) Assignee: California Institute of Technology, Pasadena, CA (US)

(*) Notice: Subject to any disclaimer, the term of this patent is extended or adjusted under 35 U.S.C. 154(b) by 120 days.

(21) Appl. No.: 09/607,548

(22) Filed: Jun. 29, 2000

Related U.S. Application Data
(60) Provisional application No. 60/141,586, filed on Jun. 29, 1999.

(51) Int. Cl.[7] ................................................. G01B 9/02
(52) U.S. Cl. ........................................ 356/495; 356/511
(58) Field of Search ................................. 356/491, 495, 356/511, 512, 450

(56) References Cited

U.S. PATENT DOCUMENTS 4,853,534 A * 8/1989 Dakin .................... 250/227.17
5,301,010 A * 4/1994 Jones et al. ................. 356/479

* cited by examiner

Primary Examiner—Samuel A. Turner
Assistant Examiner—Patrick Connolly
(74) Attorney, Agent, or Firm—Fish & Richardson P.C.

(57) ABSTRACT

A dual beam interferometer device is disclosed that enables moving an optics module in a direction, which changes the path lengths of two beams of light. The two beams reflect off a surface of an object and generate different speckle patterns detected by an element, such as a camera. The camera detects a characteristic of the surface.

23 Claims, 2 Drawing Sheets

DUAL BEAM OPTICAL INTERFEROMETER

CROSS-REFERENCE TO RELATED APPLICATIONS

This application claims benefit of U.S. Provisional application No. 60/141,586, filed Jun. 29, 1999.

STATEMENT AS TO FEDERALLY-SPONSORED RESEARCH

The invention described herein was made in the performance of work under a NASA contract, and is subject to the provisions of Public Law 96-517 (U.S.C. 202) in which the contractor has elected to retain title.

BACKGROUND

Common interferometer designs use a beam to measure characteristics of a surface that is being imaged.

U.S. Pat. No. 5,671,050 suggested using two different beams to measure information from the object. The two beams are reflected at different angles to the surface, and the distance to the object surface can be scanned.

In addition to the patent described above, U.S. Pat. Nos. 3,958,884, 5,502,562, and 5,011,280 teach interferometry techniques.

SUMMARY

The present application teaches a dual beam interferometer with a number of additional advantages. One advantage is reference and signal beams may automatically be of the same magnitude independent of the reflectivity of the object. In one embodiment, two parallel beams are reflected from an object, and the spacing between the beams may be scanned. Imaging may be done with very small numerical aperatures which allows long working distance and smaller optics.

BRIEF DESCRIPTION OF THE DRAWINGS

These and other aspects will now be described in detail with reference to accompanying drawings wherein.

DETAILED DESCRIPTION

One problem in interferometry is caused by the diffraction limit of light. The diffraction limit often forms a limit on sizes of features that can be imaged. The present system allows beating this diffraction limit.

The present application teaches a system that can be analogized to a speckle interferometer using a variable speckle. The distance between different components in the interferometer can be varied in order to vary the speckle. By changing the distance between the light beams, different "speckle" patterns can be produced.

These patterns include information about the surface, at the resolution of the minimum distance between the two beams.

The shape of optics may vary with temperature. The present invention overlaps the signal and reference beam paths. This may, at least partially, compensate for the shape change with temperature. In, addition, an interferometer design which has the biggest overlap between signal and reference beams may be desirable to measure variations in the shape of optics with temperature.

Since the reference and signal beams travel in nearly the same air space, the distance to the object can be arbitrary. In this way, effects of index variations in the air are reduced. High frequency localized index variations, such as turbulance, may still cause problems.

Figure 1:
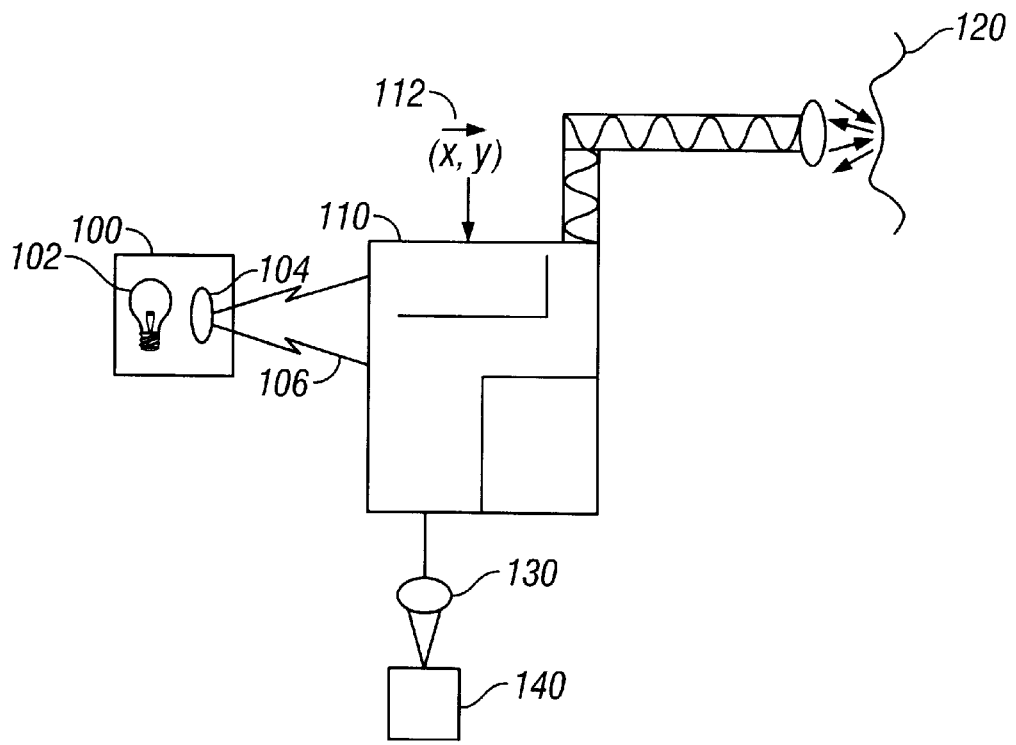
FIG. 1 shows a block diagram of the present system.

The basic system is shown in the block diagram of FIG. 1. A light source 100 produces spatially incoherent light. The light can be produced, for example, by a light bulb 102, or alternatively a light emitting diode, or a laser with a moving diffuser. The light is collimated by collimated light beam is input into the beam splitting and combining optics module 110. This optics module 110 separates the light into two beams which are separated by some distance xy. (x,y) are the coordinates for the separation between the two beams in the plane orthogonal to beam propagation. The vector xy 112 is shown as a control signal which changes the input light 106. Objective optics 118 may or may not be used depending on the desired numerical aperture.

Two beams of light are coupled to the surface 120 to be measured, and reflected back from that surface 120 through to imaging optics 130 to a camera 140. The camera 140 receives information that indicates some characteristic of the surface 120. The measurement can include detection of interference fringes between the two beams. The two beams may travel substantially the same distance and impinge the surface, offset from each other by a small distance.

Separation of the beams introduces a delta function spatial coherence into the object illumination e.g., white light (spacially incoherent), i.e,. This forms a type of speckle interference pattern on the camera 140. This pattern can then be measured as the location or distance of the separation between the two beams changes. As the separation between beams changes, the location of the delta function in the spatial coherence and the amount of the spatial coherence also changes. A spatial autocorrelation function then can be used to accurately determine the details of the object's surface. Because of this, phrase objects can be accurately imaged. Another way to think of the embodiment is as a scanning Speckle interferometer.

Figure 2:
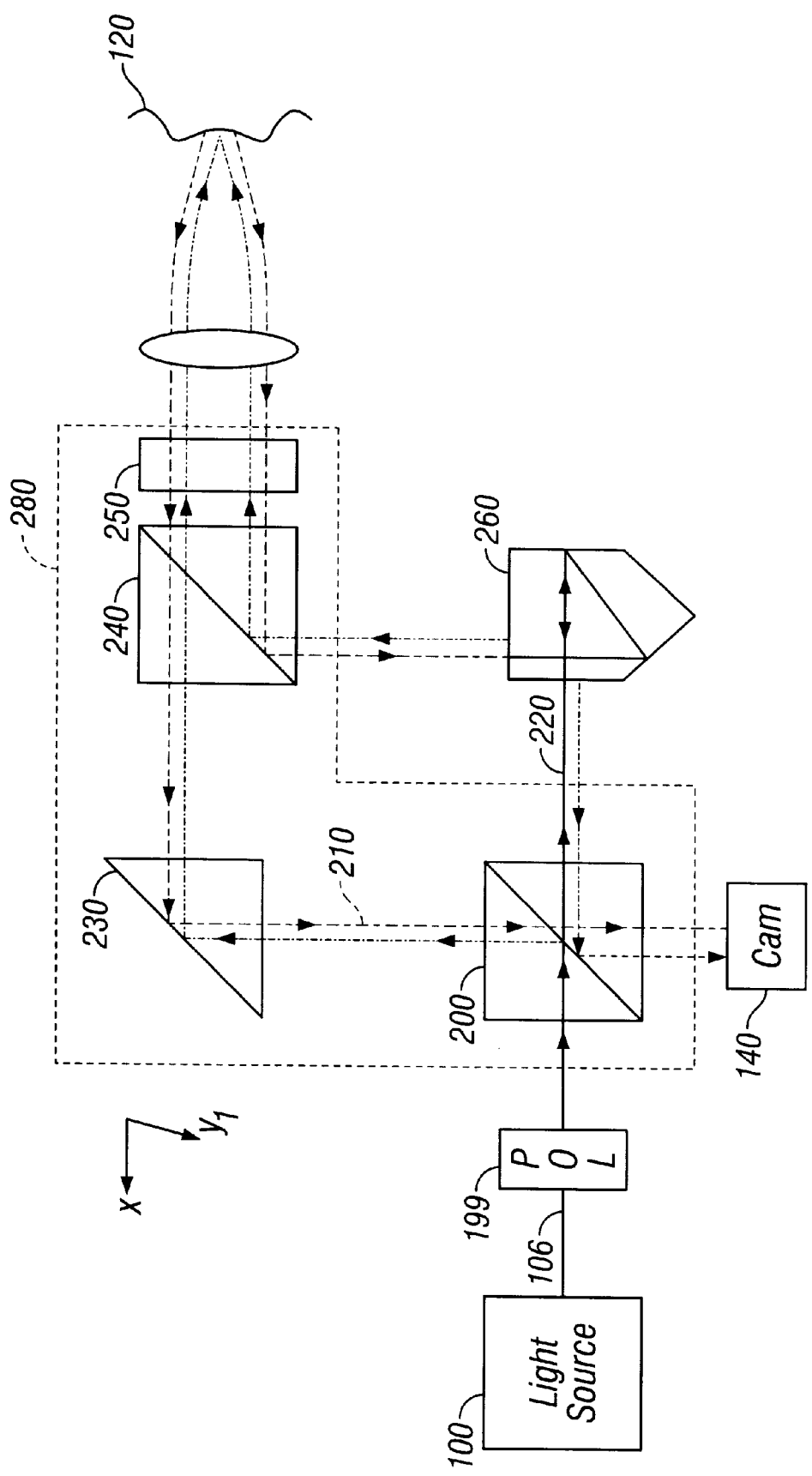
FIG. 2 shows a more detailed optical diagram of the present system.

The optical details of the interferometer is shown in FIG. 2 with the two beams being shown using different kinds of lines. The collimated light source 100 produces output 106 which may be polarized by polarizer 199. That output light is then coupled to a first beam splitter 200 which may be non-polarizing. The light from beam splitter 200 is output into two separate light beam paths: a first outgoing light beam path 210 shown as evenly dotted lines, and the second outgoing light beam path 220 shown as dot and dashed lines.

The first path 210 comes out of the non-polarizing beam splitter 200, and couples to a right angle prism 230. The right angle prism 230 reflects the beam to a second beam splitter 240. The second beam splitter 240 is polarizing. A quarter wave plate 250 is placed at the output of the second beam splitter 240, to rotate the polarization. The second beam 220 is coupled to a right angle reflector 260 which reflects the beam 220 towards the beam splitter 240. The beam is coupled into beam splitter 240 at a second location, and impinges on that second location onto the surface 120. The objective lens 118 may or may not be used depending on the required numerical aperture which determines the diffraction limited imaging resolution. The system may further comprise a polarizer 290 and imaging optics 292.

The structure is arranged such that a light beam couples onto the surface 120, and back out of the surface 120. Each of the light beams travel along the same path in opposite directions. In this way, substantially the same path length is traveled in both directions. Both beams also pass through all of the optics, thereby equalizing any influence from the optics.

Fringes (e.g. white light) are formed on the camera 140 by the interference of the light beams.

A movable module is shown by portion 280. This portion 280 can be moved, to allow the two beam splitters 200, 240 and the right angle prism 230 to be moved as a group. This changes the spacing between the two beams without changing the pathlength difference of the beams. The spacing can be changed in the plane of the paper, that is the x direction, or can be changed orthogonal to the plane of the paper, the y direction. A variable beam height adjustment may be added to FIG. 2 to change the spacing in the y direction. The two light paths however, reach the object 120 using similar length paths, and the object 120 is imaged from two sides by the two beams onto the surface of the camera 140. The reflections from the beam 220 travel the path of the beam 210 on the return trip. Analogously, the reflections from the beam 210 travel the path of the beam 220 on the return trip. While this system describes use of incoherent light, it should be understood that spacially coherent light could also be used to obtain a phase front correlator.

Figure 3A:
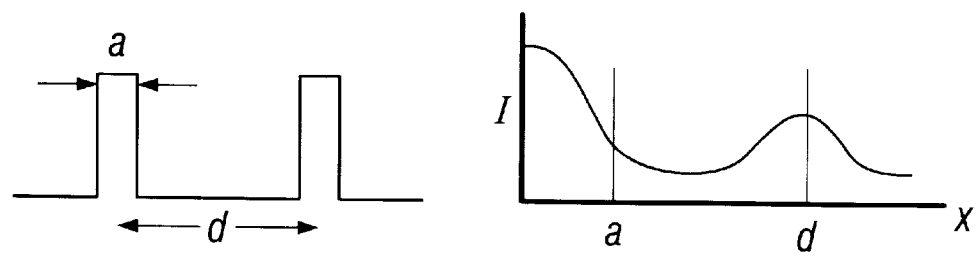
FIGS. 3A and 3B show how an increase in resolution can be obtained by the present system.
Figure 3B:
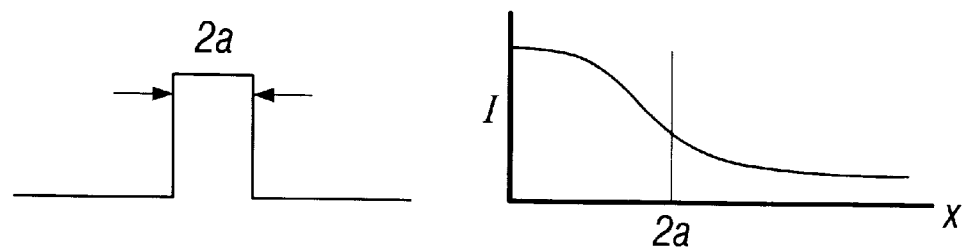

The system of FIG. 1 may accurately image extremely rough surfaces such as paper. One embodiment allows imaging of the speckle pattern which is visible on rough surfaces. This can be done by imaging with a resolution that may be better then the diffraction limit. FIGS. 3A and 3B show how this is possible. In FIG. 3, the left side is the phase across the phase object and the right side shows the intensity of the camera pixel as a function of the beam spacing. Two cases are shown: (a) two features within the pixel, (b) one feature within the pixel. FIG. 3A shows the amplitude as a function of beam spacing on a pixel of the camera 140. Two phase features are being imaged. As the spacing is changed from 0 to the pixel size, the variation in pixel intensity indicates the presence of two steps (left side) that have a width a and a spacing d.

FIG. 3B shows the same measurement for a single phase feature. The variation in pixel intensity (right side) shows a single step with width 2a. With a conventional imaging system, these two phase systems could not be distinguished.

Although only a few embodiments have been described in detail above, other modifications are possible.

What is claimed is:

1. A dual beam interferometer operable to detect a characteristic of a surface, comprising:
   an interferometer arrangement, forming a first beam and a second beam, said first beam traversing a first optical path, being reflected from the surface and traversing a second optical path, and said second beam traversing said second optical path, being reflected from the surface and traversing said first optical path, wherein the first and second beams travel total optical paths that are substantially similar in length; and
   a detection element which detects an interferometric relationship between said beams, wherein the interferometric relationship provides a characteristic of the surface.

2. The dual beam interferometer of claim 1, comprising:
   a first beam splitter configured to split an initial beam of light into the first and second beams;
   a first reflector configured to reflect the first beam along the first optical path and to reflect the second beam along the first optical path;
   a second beam splitter configured to direct the first beam along the first optical path and to reflect the second beam along the second optical path; and
   a second reflector configured to reflect the first beam along the second optical path and to reflect the second beam along the second optical path.

3. The dual beam interferometer of claim 2, further comprising a variable beam height adjustment module operable to move the beam splitters and at least one reflector.

4. The dual beam interferometer of claim 2, wherein the initial beam of light is collimated.

5. The dual beam interferometer of claim 2, further comprising a polarizer between an initial light source and the first beam splitter.

6. The dual beam interferometer of claim 2, wherein the first beam splitter is a non-polarizing beam splitter.

7. The dual beam interferometer of claim 2, wherein the first reflector is a right angle prism.

8. The dual beam interferometer of claim 2, wherein the second beam splitter is polarizing.

9. The dual beam interferometer of claim 2, further comprising a quarter wave plate between the second beam splitter and the surface, the quarter wave plate operable to rotate the first and second beams.

10. The dual beam interferometer of claim 2, wherein the second reflector comprises a right angle reflector.

11. The dual beam interferometer of claim 2, further comprising a polarizer and imaging optics between the first beam splitter and the detection element.

12. The dual beam interferometer of claim 2, further comprising a moving element operable to move the beam splitters and at least one reflector in a direction that changes a separation distance between the first and second beams in a plane of the surface.

13. The dual beam interferometer of claim 12, wherein varying the distance between the first and second beams produce various speckle interference patterns that are detectable by the detection element.

14. The dual beam interferometer of claim 2, further comprising objective optics between the surface and second beam splitter.

15. The dual beam interferometer of claim 1, wherein the detection element comprises a camera.

16. The dual beam interferometer of claim 1, wherein the first and second beams originate from a spatially incoherent light source.

17. The dual beam interferometer of claim 1, wherein the first and second beams travel through air between optical elements of the interferometer.

18. The dual beam interferometer of claim 1, wherein the detection element measures interference fringes produced by the first and second beams.

19. The dual beam interferometer of claim 1, wherein the detection element measures speckle interference patterns produced by the first and second beams.

20. The dual beam interferometer of claim 1, wherein the detection element measures interference fringes produced by the first and second beams.

21. The dual beam interferometer of claim 1, wherein the interferometer provides imaging with a resolution better than the diffraction limit of light.

22. A method of detecting a characteristic of a surface with two beams of light, the method comprising:
   forming a first beam and a second beam;
   directing the first beam along a first optical path to reflect from the surface and traverse a second optical path;
   directing the second beam along the second optical path to reflect from the surface and traverse the first optical path, wherein the first and second beams travel total optical paths that are substantially similar in length; and detecting an interferometric relationship between said beams, wherein the interferometric relationship provides a characteristic of the surface.

23. The method of claim 22, further comprising performing a spatial autocorrelation function to determine a characteristic of the surface.

* * * * *